United States Patent [19]

Murakami

[11] 4,311,955
[45] Jan. 19, 1982

[54] PHASE CONTROL DEVICE WHICH COMPENSATES FOR INPUT VARIATIONS

[76] Inventor: Naoyuki Murakami, 2-12-2-704, Kyuden, Setagaya-Ku, Tokyo-To, Japan

[21] Appl. No.: 101,830

[22] Filed: Dec. 10, 1979

[30] Foreign Application Priority Data

Dec. 14, 1978 [JP] Japan .................................. 53-153700

[51] Int. Cl.³ .......................... G05F 5/00; G05F 1/455
[52] U.S. Cl. ................................... 323/300; 323/244; 323/267; 323/322; 323/902
[58] Field of Search ............... 307/252 B; 323/21, 24, 323/34, 241, 244, 267, 300, 322, 325, 902

[56] References Cited
U.S. PATENT DOCUMENTS

| | | | |
|---|---|---|---|
| 3,963,947 | 6/1976 | Bogel | 323/21 X |
| 4,004,214 | 1/1977 | Evans | 323/34 X |
| 4,037,135 | 7/1977 | Novey | 307/252 B |
| 4,093,908 | 6/1978 | Evans | 323/34 X |

*Primary Examiner*—A. D. Pellinen
*Attorney, Agent, or Firm*—Polster, Polster and Lucchesi

[57] ABSTRACT

A phase control device for use in a phase control circuit, which forms a comparison signal synchronous with an a.c. power source, then compares this comparison signal directly with a preset phase control angle signal, and controls a phase control element provided in the a.c. phase control circuit by the compared output.

5 Claims, 8 Drawing Figures

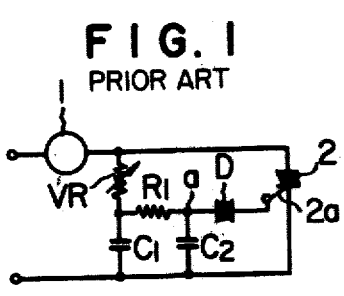
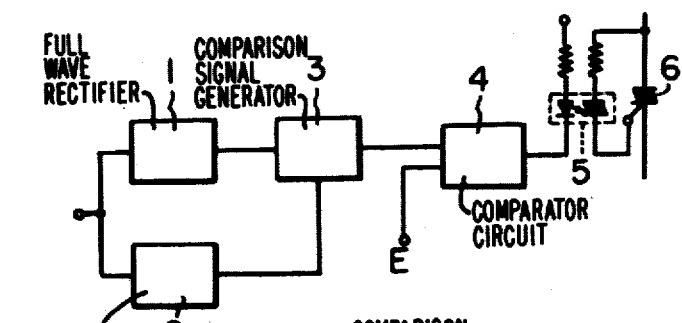
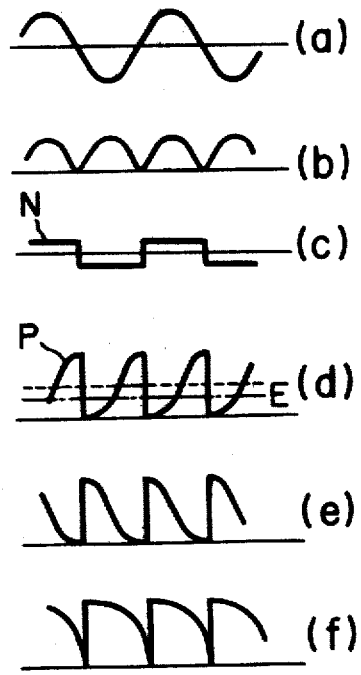
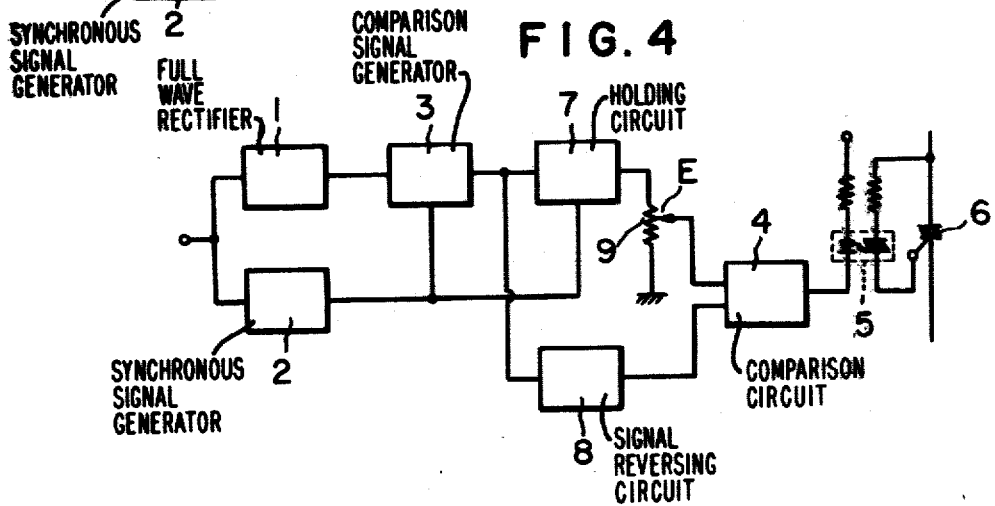

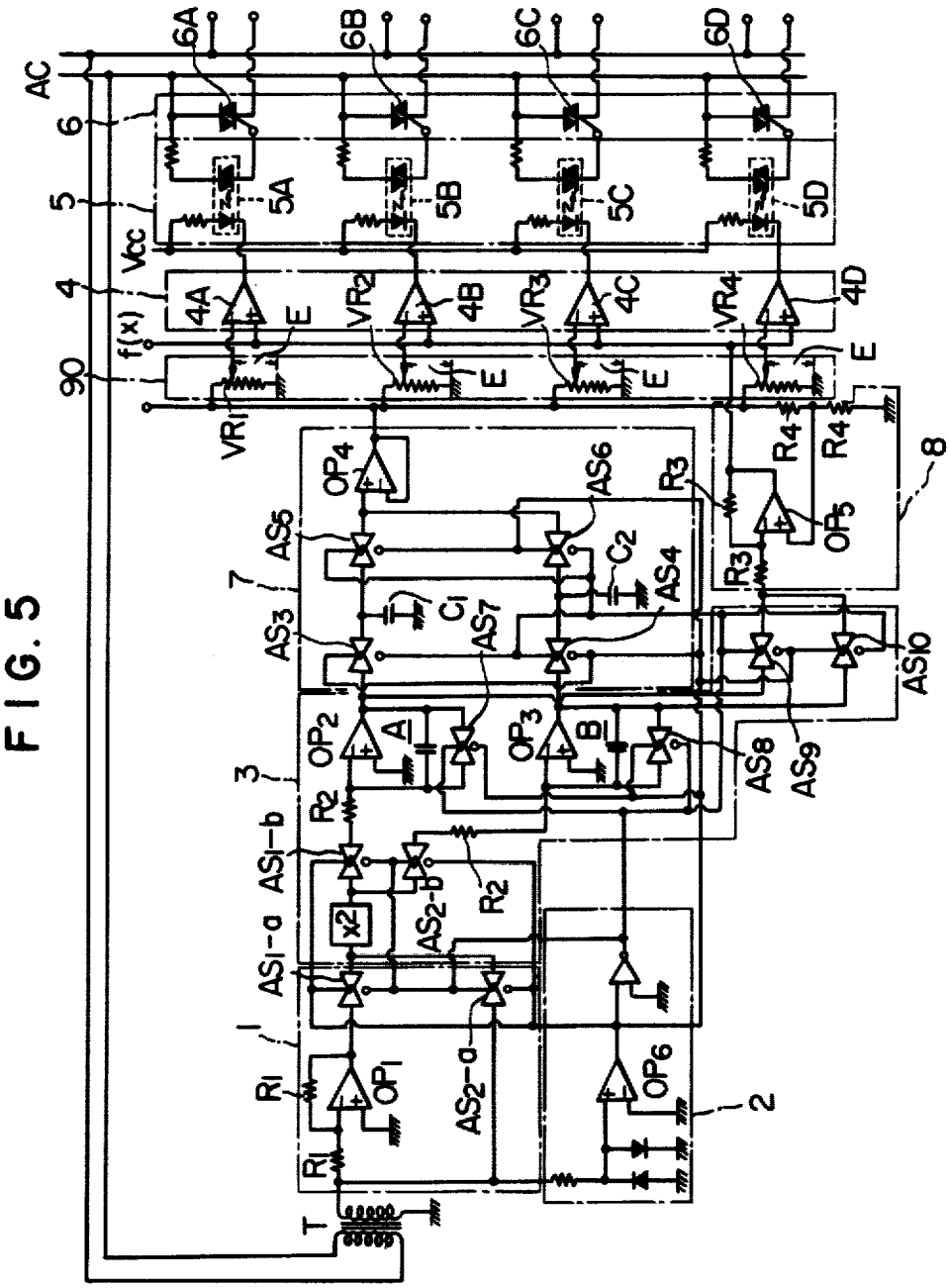
F I G. 5

PHASE CONTROL DEVICE WHICH COMPENSATES FOR INPUT VARIATIONS

BACKGROUND OF THE INVENTION

This invention is concerned with a phase control device, and aims at attaining accurate phase control.

A conventional phase control device as illustrated diagrammatically in FIG. 1 of the accompanying drawing is of such a construction that a load 1 and a phase control element 2 such as a thyrister, TRIAC, and so forth are connected in series with an a.c. power source; a variable resistor VR and a time constant element of a capacitor $C_1$, which are mutually connected in series, are connected in parallel with the abovementioned phase control element 2; a capacitor $C_2$ is connected in parallel with the abovementioned capacitor $C_1$ through a resistor $R_1$; and a connection a of the resistor $R_1$ and the capacitor $C_2$ is further connected to a gate 2a of the phase control element 2 through a trigger element D such as DIALAC, etc..

This known phase control device is to change a time for an electric potential at the connection a to reach a breakdown voltage of the trigger element D by changing the CR time constant through variations in the resistance value of the variable resistor VR, thereby controlling a conduction period of the phase control element 2, i.e., a phase control angle.

However, this known device has such a disadvantage that, when a multitude of phase control circuits as shown in FIG. 1 are to be controlled simultaneously, the trigger element D in each phase control circuit is difficult to have a uniform characteristic, i.e., a uniform phase control angle, because of fluctuation in the breakdown voltage and of dependency of the trigger element on variations in an ambient temperature and a power source voltage to be supplied to it. Further, when the trigger element D is exchanged, the phase control angle varies due to fluctuation in the characteristics of the trigger element with the consequence that no accurate phase control can be achieved. In case the power source voltage is instable or a load is low, there tends to occur erroneous operation in the phase control.

SUMMARY OF THE INVENTION

In view of the foregoing disadvantages inherent in the known type of phase control circuit, and in order to solve such difficulties, the present invention provides an improved phase control device of a construction, wherein a comparison signal synchronous with an a.c. power source of the phase control circuit is formed, then this comparison signal is directly compared with a preset phase control angle signal, and the compared result as an output is used for controlling the phase control element provided in an a.c. circuit.

According to the present invention, generally speaking, there is provided a phase control device which comprises: an a.c. power source; a full wave rectifying circuit to rectify an input signal from the a.c. power source; a synchronous signal generating circuit to generate a synchronous signal based on the input a.c. voltage; a comparison signal generating circuit to generate a comparison signal for every a.c. half wave upon receipt of said synchronous signal; a comparison circuit to directly compare said comparison signal from said comparison signal generating circuit with a preset phase control angle signal, and to obtain a control signal for phase control; a photocell connected with the comparison circuit to be actuated by the compared signal output when it has reached a set value and above; and a phase control element connected to the photocell which is rendered conductive by the actuation of the photocell to effect the required phase control.

There has thus been outlined, rather broadly, the more important features of the present invention in order that the detailed description thereof that follows may be better understood, and in order that the present contribution to the art may be better appreciated. There are, of course, additional feature of the invention that will be described hereinafter and which will form the subject of the claims appended hereto. Those skilled in the art will appreciate that the conception, upon which this disclosure is based may readily be utilized as a basis for the designing of other structures for carrying out the several purposes of the present invention. It is important, therefore, that the claims be regarded as including such equivalent construction so far as they do not depart from the spirit and scope of the present invention.

BRIEF DESCRIPTION OF ACCOMPANYING DRAWING

Specific embodiment of the present invention has been chosen for the purpose of illustration and description, and are shown in the accompanying drawing, forming a part of the specification, in which:

FIG. 1 is a circuit diagram showing one embodiment of a conventional phase control device;

FIG. 2 is a block diagram of a circuit showing a preferred embodiment of the phase control device according to the present invention;

FIG. 3 shows various signal waveforms in each part of the circuit shown in FIG. 2;

FIG. 4 is also a block diagram of a circuit showing another embodiment of the phase control device according to the present invention;

FIGS. 5 and 6 illustrate physical constructions of analog type phase control circuits according to the present invention;

DETAILED DESCRIPTION OF PREFERRED EMBODIMENTS

Figure 6:
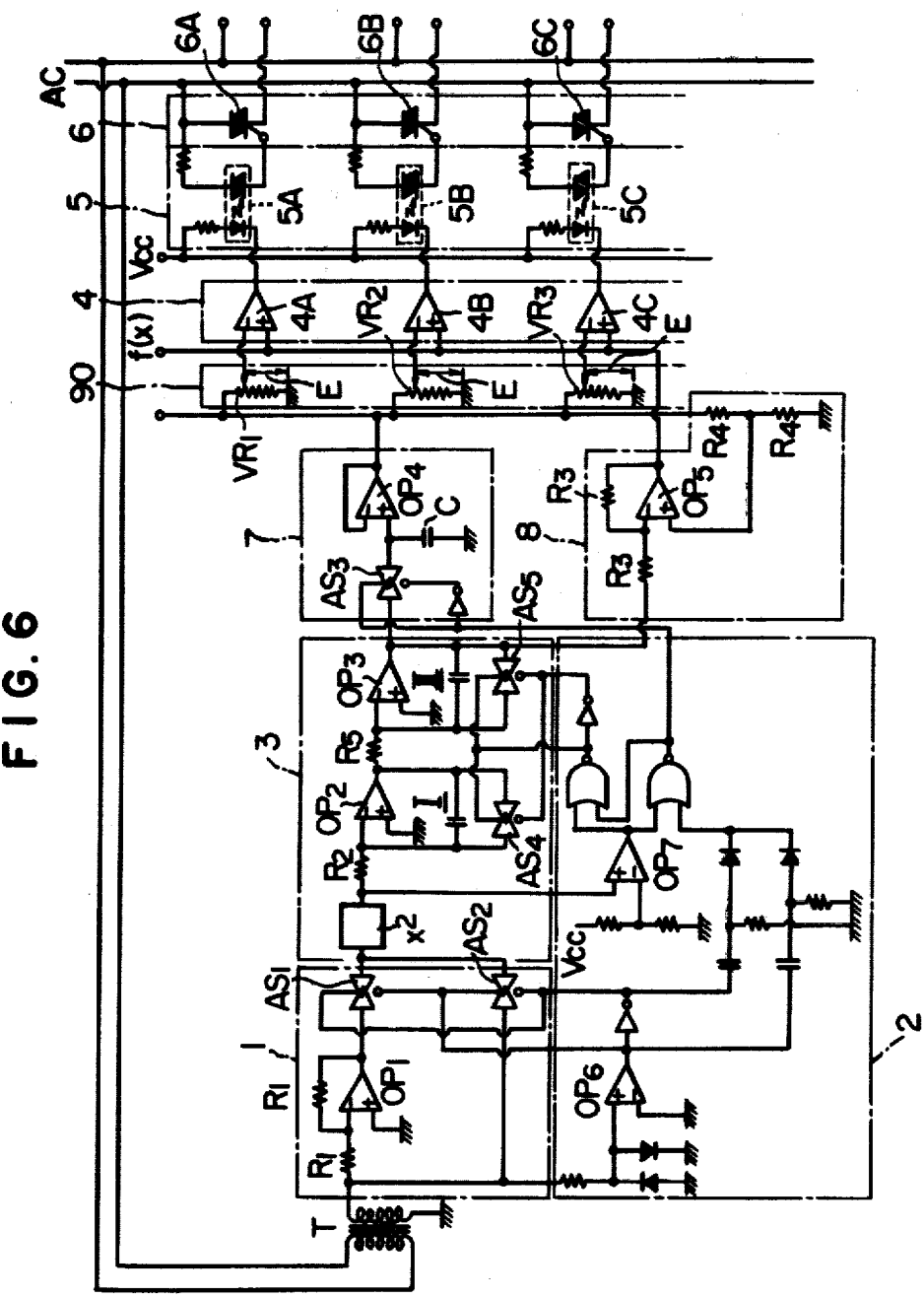

Referring to FIG. 2 showing a preferred embodiment of the phase control device according to the present invention, a reference numeral 1 designates a full wave rectifier (FIG. 3b), a numeral 2 refers to a synchronous signal generating circuit which generates a synchronous signal N (FIG. 3c) based on an a.c. voltage AC introduced as an input into the full wave rectifier 1, a reference numeral 3 designates a comparison signal generating circuit which generates a comparison signal P (FIG. 3d) for every half a.c. wave upon receipt of the synchronous signal, and a numeral 4 refers to a comparison circuit which compares the comparison signal P with a preset phase control angle signal E.

The abovementioned comparison signal P (FIG. 3d) is produced by forming clear pulses through the synchronous signal (FIG. 3c) generated on the basis of the abovementioned a.c. voltage, while integrating the full wave rectified voltage (FIG. 3b) of the a.c. voltage (FIG. 3a) and then by periodically returning the abovementioned integrated voltage to a predetermined voltage level. This comparison signal (FIG. 3d) is reversed its polarity as shown in FIG. 3e, followed by its comparison with the phase control angle signal E. Incidentally, the illustrated embodiment uses the full wave rectified voltage of an a.c. voltage as a voltage to be integrated, although it may be a voltage having an arbitrary waveform.

Now assume that the phase control angle signal E is established at a value shown with a horizontal dot-and-dash line E in FIG. 3d. The comparison circuit 4 actuates a TRIAC photocell 5 when the comparison signal P takes a value above its set value E to thereby render conductive a phase control element 6 provided in the a.c. circuit, and control the same.

As stated in the foregoing, since the phase control device according to the present invention compares the comparison signal P formed in synchronism with the a.c. power source with the preset phase control angle signal E, and controls the phase control element 6 with its compared output, it has less variations in its characteristic with respect to temperature change, hence the circuit is stable and is less liable to deteriorate with lapse of time. As the consequence of this, the phase control can be done with extreme accuracy. In addition, using a single comparison signal P, many numbers of load circuits, e.g., one hundred or so, can be phase-controlled, while maintaining their uniform characteristics. Further, when a comparison voltage is produced on the basis of an output from a supply power source as in the illustrated embodiment, there can be effected a precise phase control without being affected by the waveforms of the power source voltage and variations in frequency, etc.. Furthermore, when a comparison voltage is produced based on an output from an external power source, an electric power or a voltage to be taken out can be maintained constant, irrespective of variations in the a.c. voltage and frequency.

In the embodiment shown in FIG. 2, the phase control angle signal E is obtained from an external power source which is omitted in the drawing. In another embodiment of the phase control device according to the present invention as shown in FIG. 4, the phase control angle signal E is formed on the basis of an output from the signal generating circuit 3. In the drawing, reference numerals 1 through 6 designate the same circuit components as those in FIG. 2. A numeral 7 refers to a holding circuit which holds the maximum value of an output from the comparison signal generating circuit 3, a numeral 8 refers to a signal reversing circuit to reverse the comparison signal P from its middle point (a position shown with a dot line in FIG. 3d) into a waveform shown in FIG. 3e, and a reference numeral 90 designates a variable resistor which divides an output voltage from the holding circuit 7 to establish a phase control angle signal E.

When the phase control device is constructed as this embodiment of the present invention, even if there occur changes in the power source frequency and voltage waveform, the comparison signal and the phase control angle signal change in accordance with the power source in response to such change in the power source frequency and voltage waveform, hence there is no variations in the phase control characteristic.

FIG. 5 shows an actual circuit construction for the embodiment shown in FIG. 4. An alternating current voltage AC generated at the secondary side of a transformer T passes through analog switches $AS_{1-a}$ and $AS_{2-a}$ which are alternately opened and closed by a synchronous signal N (FIG. 3c), a square circuit $x^2$, and analog switches $AS_{1-b}$ and $AS_{2-b}$, and is alternately integrated, for every half wave, in integration circuits A and B forming a signal generating circuit 3. Outputs from these integration circuits A and B pass through analog switches $AS_3$ and $AS_4$, and, after the maximum values have been stored in capacitors $C_1$ and $C_2$, they are held in holding circuit 7 by conduction of analog switches $AS_5$ and $AS_6$ for every half wave. An output from this holding circuit 7 is divided its voltage by variable resistors 90 consisting of $VR_1$, $VR_2$, $VR_3$, $VR_4$, ... to obtain the phase control angle signal E.

Further, the outputs from the integration circuits A and B pass through analog switches $AS_9$ and $AS_{10}$ for every half wave to be rendered a comparison signal P shown in FIG. 3d. The comparison signal P passes through a signal reversing circuit 8 to be reversed its waveform as shown in FIG. 3e. And, as mentioned above, the comparison signal P is compared with the phase control angle signal E for the phase control, whereby, when the light source is used as the load, its light quantity, etc. can be adjusted. Incidentally, when the analog switches $AS_{1-a}$ and $AS_{2-a}$ are alternately opened and closed for the full wave rectification, the phase control is usually possible over a very wide range of approximately 0.03% to 99% of an a.c. power source.

FIG. 6 is an example of the circuit construction, wherein the comparison signal generating circuit 3 is constructed with serially connected integration circuits I and II so that the integration operations may be conducted for two times (FIG. 3f) after the output from the full wave rectification circuit 1 has passed through the square circuit $x^2$. In this example, the circuit construction at the front stage side of the analog switches $AS_1$ and $AS_2$ and the rear stage side of the signal reversing circuit 8 are substantially same as those in the example of FIG. 5.

Incidentally, in the case of the single integration operation as in the example of FIG. 5, the phase control circuit is of a power comparison type, while, in the case of the double integration operations as in the example of FIG. 6, it is of a voltage comparison type.

Figure 7:
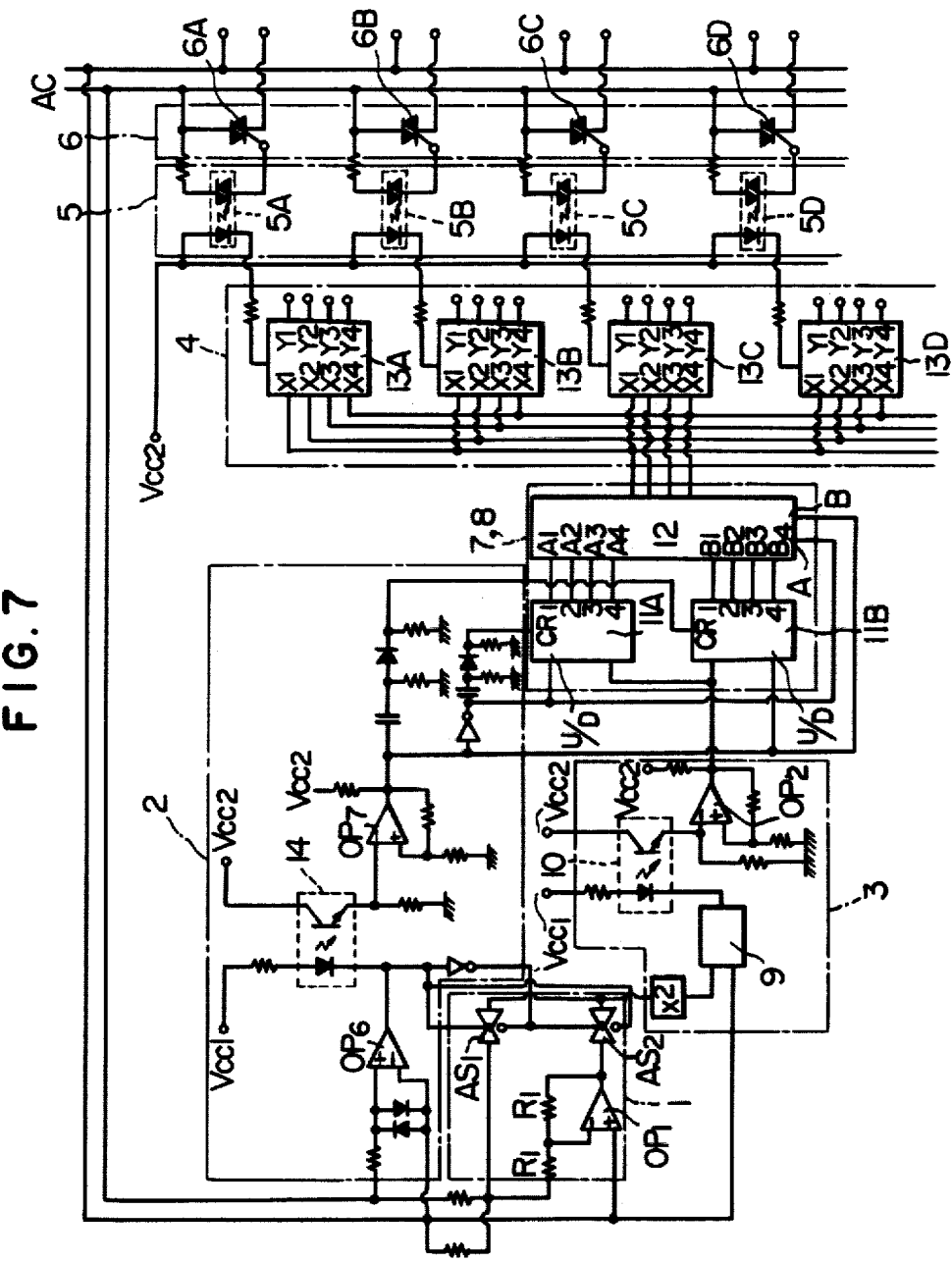
FIG. 7 illustrates a physical construction of a digital type phase control circuit according to the present invention.

FIG. 7 shows an actual circuit for the phase control device according to the present invention, in which it is constructed in a digital type. In more detail, output from the full wave rectification (FIG. 8b) is caused to pass through the square circuit $x^2$ to convert the half wave component unit into pulse number (FIG. 8H) by means of a VF converter, with which pulse a photocell 10 is intermittently actuated to store the pulse number in a memory circuit 11A. In this instance, the memory circuit is provided with a frequency divider, with which pulses I, J, and K having respective frequencies of ½, ¼ and ⅛ are produced on the basis of an output pulse H from the VF converter 9, and a 4-bit construction is produced in this memory circuit with the pulses H, I, J and K to store the pulse numbers therein.

Subsequently, the pulse number of the next half wave component unit is stored in the memory circuit 11B by change-over of the synchronous signal, and, at the same time, the contents of the memory circuit 11A is taken out, while counting down the same by a subtraction counter 12. Then, count numbers for obtaining a predetermined phase control angle which has been preset in the comparison counters 13A, 13B, 13C, 13D, . . . are compared with subtracted count numbers of the above-mentioned subtraction counter 12, and the phase control element 6 is rendered conductive for the required control with outputs from the comparison counters when both count numbers have become equal each other. To the count number setting terminals of the comparison counters 13A to 13D, . . . , there can be directly connected digital control signal output terminals such as computer, etc..

Incidentally, the a.c. voltage may better be applied to the VF converter 9 after it is subjected to a waveform-conversion in an arbitrary shape so that the phase control of a characteristic meeting the intended purpose may be performed after it is subjected to the full wave rectification.

Figure 8:
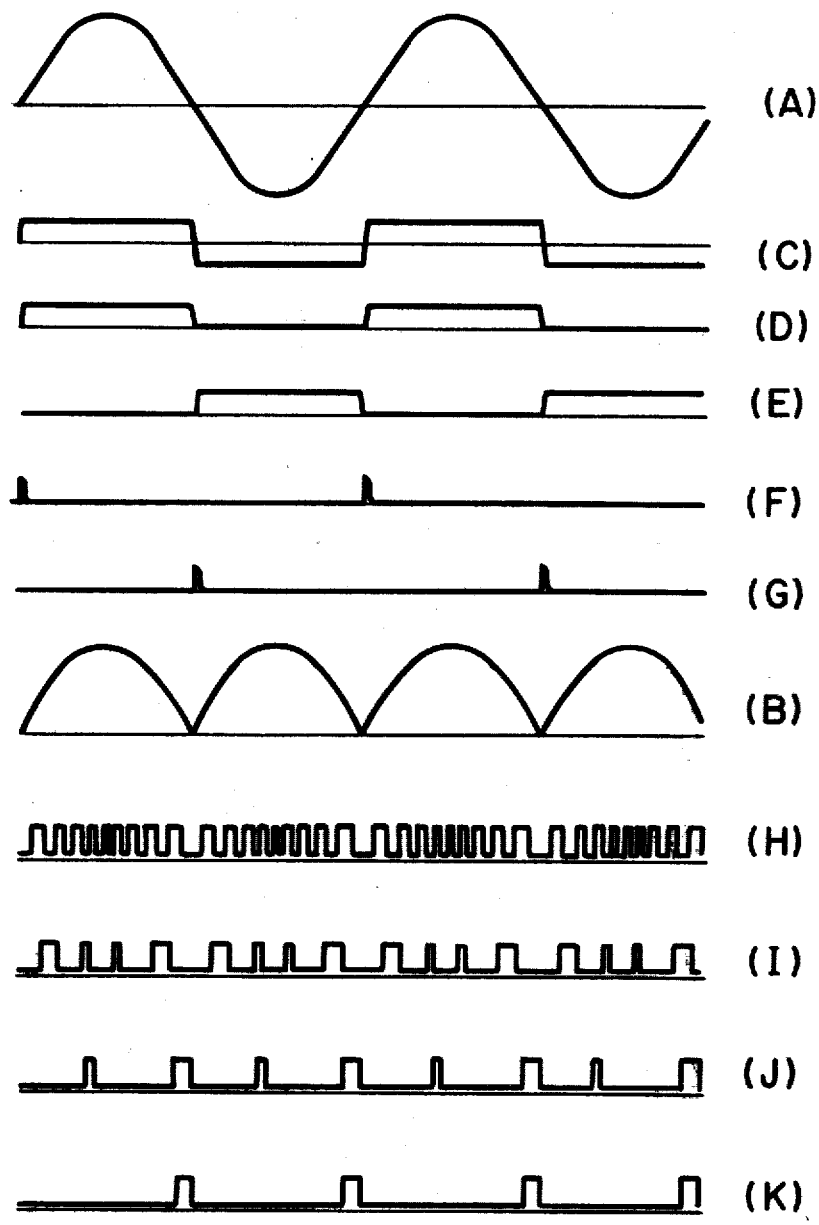
FIG. 8 shows various waveforms diagrams in each part of the circuit shown in FIG. 7.

Further, FIG. 8A shows an alternating current to be supplied, FIG. 8C shows a synchronous signal derived from the alternating current supplied, and FIGS. 8D, 8E, and 8G illustrate synchronous signals to be applied to the memory circuits 11A, 11B and the subtraction counter 12.

What is claimed is:

1. A phase control device, comprising:
   (a) an a.c. power source;
   (b) a full wave rectifying circuit connected to said a.c. power source and for rectifying an input a.c. voltage from said a.c. power source;
   (c) a synchronous signal generating circuit also connected to said a.c. power source and for generating a synchronous signal based on the input a.c. voltage;
   (d) a comparison signal generating circuit connected to said full wave rectifying circuit and said synchronous signal generating circuit and for generating a comparison signal for every half a.c. wave upon its receipt of said synchronous signal;
   (e) a power source different from said input a.c. power source for producing a preset phase control angle signal;
   (f) a comparison circuit for directly comparing said comparison signal from said comparison signal generating circuit with said preset phase control angle signal from said different power source, and for obtaining a control signal for the phase control; and
   (g) at least one phase control element connected with said comparison circuit, and rendered conductive by an output from said comparison circuit.

2. A phase control device, comprising:
   (a) an a.c. power source;
   (b) a full wave rectifying circuit connected to said a.c. power source to rectify an input a.c. voltage from said a.c. power source;
   (c) a synchronous signal generating circuit also connected to said a.c. power source to generate a synchronous signal based on the input a.c. voltage;
   (d) a comparison signal generating circuit connected to said full wave rectifying circuit and said synchronous signal generating circuit to generate a comparison signal for every half a.c. wave upon receipt of said synchronous signal;
   (e) a holding circuit connected to said comparison signal generating circuit to hold therein the maximum value of an output therefrom;
   (f) a signal reversing circuit also connected to said comparison signal generating circuit to reverse the direction of a comparison signal waveform derived therefrom;
   (g) a variable resistor connected to said holding circuit to divide an output voltage from said holding circuit so as to establish a preset phase control angle signal;
   (h) a comparison circuit to directly compare said comparison signal from said comparison signal generating circuit with said preset phase control angle signal to be obtained from a different power source from said a.c. power source, and to obtain a control signal for the phase control; and
   (i) at least one phase control element connected with said comparison circuit, said element being rendered conductive by an output from said comparison circuit.

3. The device as set forth in claim 2, wherein a plurality of integration circuits constituting said comparison signal generating circuit are connected in parallel.

4. The device as set forth in claim 2, wherein a plurality of integration circuits constituting said comparison signal generating circuit are serially connected to enable the integration operations to be conducted for a plurality of times after an output from said full wave rectifier circuit has passed through a square circuit therein.

5. The device as set forth in claim 2, wherein said comparison signal generating circuit comprises a square circuit, a VF converter, photocell means to convert an output from said full wave rectifier into pulse number, and said holding and signal reversing circuits include a plurality of memory circuits and subtraction counter to store said pulse number and to count down the contents of said memory circuits.

* * * * *